Patented June 22, 1954

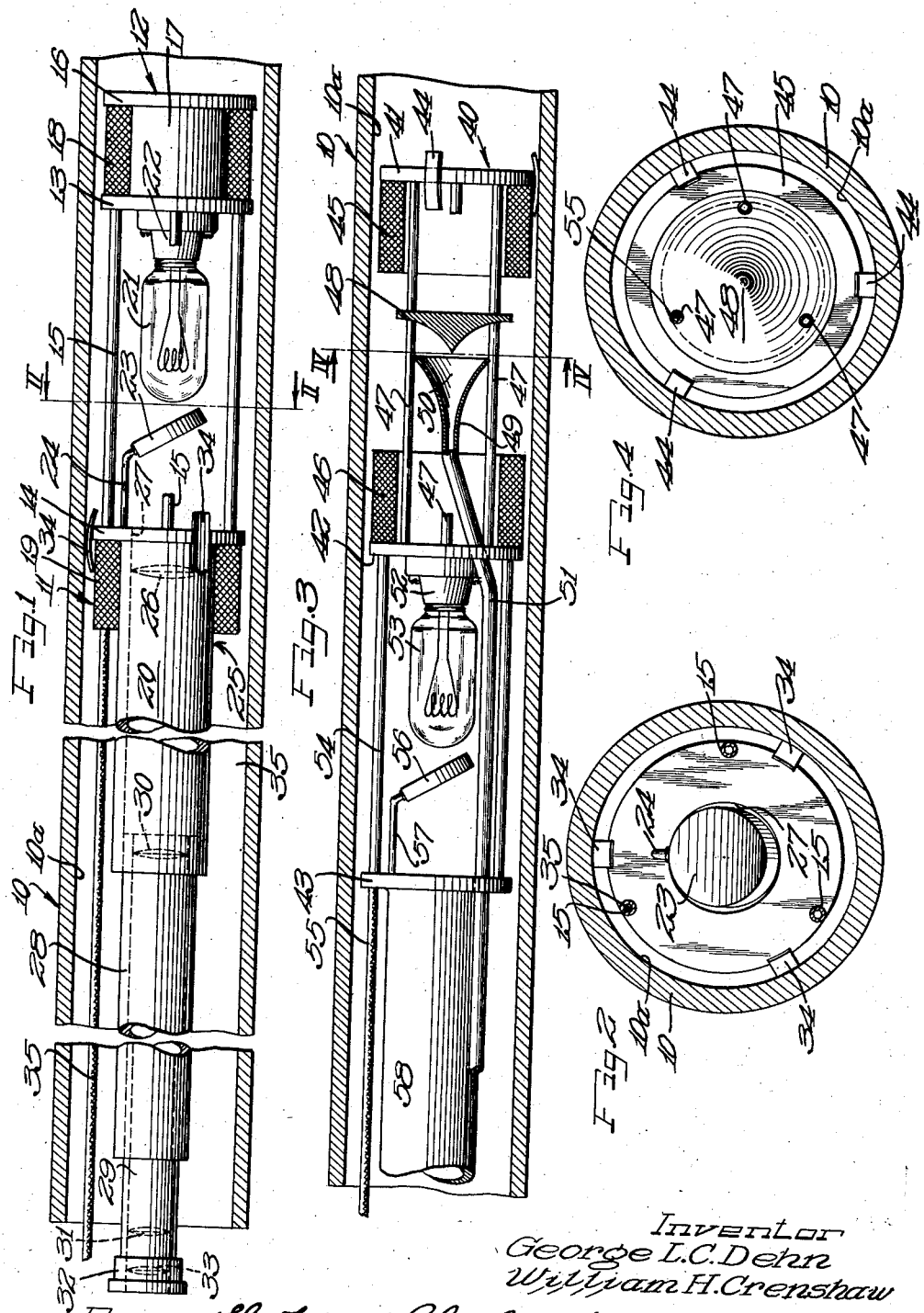

2,682,032

UNITED STATES PATENT OFFICE 2,682,032

MEANS AND METHOD FOR INSPECTING INNER SURFACES OF TUBULAR MEMBERS

George L. C. Dehn, Dallas, and William H. Crenshaw, Midland, Tex., assignors to Magnaflux Corporation, Chicago, Ill., a corporation Application March 8, 1950, Serial No. 148,462

12 Claims. (Cl. 324—38)

The present invention relates to means and a method for inspecting inner surfaces of tubular members. More particularly, the present invention relates to apparatus for the non-destructive, magnetic particle inspection of the interior surfaces of tubular members and to a method of inspecting said surfaces.

The principles of non-destructive, magnetic particle inspection for magnetizable members are well known. However, no entirely satisfactory method or apparatus employing these principles has heretofore been provided for efficiently inspecting the interior surfaces of a tubular member. The present invention now proposes a simple, inexpensive, easily employed apparatus and method whereby said testing may be carried out in an efficient, substantially fool-proof manner.

The apparatus of the present invention includes a magnetizing head of less diameter than the inner diameter of the tubular member to be inspected, so that the head can be readily inserted into the bore of the member. The head carries means for setting up a magnetic field with the lines of flux extending longitudinally of the wall surfaces of the tubular member. As is well known, the setting up of such a magnetic field will cause a definite orientation of the magnetizable particles about any flaws or surface discontinuities in the object to which the field is applied, in the present instance, in the tubular member.

In order to observe this particle orientation, viewing means are provided by the apparatus of the present invention. These viewing means include a telescopic type viewer secured to the head and insertable therewith into the bore of the member being tested. The telescopic viewer extends through the bore of the member being tested with the eye piece of the viewer projecting from the bore. A light source is preferably carried by the head for illuminating the inner surfaces of the member being tested and reflective means are also carried by the head to reflect light from the inner surfaces of the member axially of the member through the telescopic viewing means so that particle orientation upon the surfaces may be readily viewed.

The method of the present invention includes the steps of applying to the inner surface of a tubular member a magnetizable material, preferably in the form of finely divided ferromagnetic particles having visual characteristics differing from those of the member being tested, magnetizing the wall surface of the member to obtain magnetic orientation of the material about any flaws present in the surface, and the visual inspection of the inner wall surface to determine the position and nature of such orientation. The first two steps of this method may be carried out in either order.

It will thus be seen that the present invention provides both apparatus and method for the inspection of inner wall surface of a tubular member and the location of flaws present therein.

It is, therefore, an important object of the present invention to provide means for the inspection of inner wall surfaces of tubular members.

Another important object of the present invention is to provide an improved method for the magnetic inspection of the inner wall surface of a tubular member.

It is a further important object of the present invention to provide apparatus for the inspection of the interior wall surface of a tubular member, including means for magnetizing the inner wall surface of the member to cause an orientation of magnetizable particles applied thereto and means for visually inspecting the inner wall surface from a remote point to determine the position and nature of such orientation.

Still another important object of the present invention is to provide a method for the magnetic particle inspection of inner wall surface of tubular members including the steps of applying magnetizable particles to the inner wall surface, magnetizing the wall surfaces to cause the magnetic particles to build up at the locations of any flaws present therein, and the visual inspection of inner wall surface to observe the pattern assumed by such magnetic particles, the first two steps being carried out in either order.

Other and further important objects of the present invention will be apparent from the disclosures in the specification and the accompanying drawings.

On the drawings:

Figure 1 is a longitudinal, sectional view, partly in elevation, through the axis of a tubular member with apparatus of the present invention positioned therein;

Figure 2 is an enlarged sectional view taken along the plane II—II of Figure 1;

Figure 3 is a view similar to Figure 1 showing the positioning of a modified form of apparatus of the present invention within a tubular member; and Figure 4 is an enlarged sectional view taken along the plane IV—IV of Figure 3.

As shown on the drawings:

In Figure 1 reference numeral 10 refers generally to a tubular member, such as a piece of pipe, tubing or conduit formed of a magnetizable material, in which is positioned apparatus 11 of the present invention.

In the embodiment of Figure 1, the apparatus 11 comprises a magnetizing head 12 including a pair of spaced, generally circular disks 13 and 14 of a diameter less than the interior diameter of the member 10 joined by a plurality of supporting tubes or rods 15 extending axially of the member 10 within the bore thereof. An additional disk 16 is secured in spaced relation to the disk 13 by means of a generally cylindrical collar or other joining element 17 of lesser diameter than the disk. The head 12 carries a pair of electromagnetic coils 18 and 19, one of the coils, namely the coil 18, being secured about the collar 17 between the disks 13 and 16, and the other coil, namely the coil 19, abutting the disk 14 and surrounding a tubular member 20 extending axially of the tubular member 10 from the disk 14.

A light source, such as a bulb 21, is secured to the disk 13 by suitable means, as by a socket 22, the bulb 21 extending from the disk 13 to lie between the disks 13 and 14. A mirror 23 is secured to the disk 14 by means of an angle arm 24, the mirror extending into closely spaced relation to the light source 21 and being inclined at an angle, preferably on the order of 45°, to the axis of the head 12 and the tubular member 10.

The telescopic viewing means, indicated generally at 25, are provided for viewing the inner surfaces of the tubular member 10. The telescopic viewing means 25 includes the tubular member 20 extending axially through the coil 19 and secured to the disk 14 of the head 12 as hereinbefore described. A full vision objective lens 26 is mounted inside the tube 20 adjacent that end of the tube 20 secured to the disk 14, which is centrally apertured at 27 so that the image of the inner surface of the tubular member, as reflected by the mirror 23, may be transmitted by the lens 26. A plurality of fixed nesting tubular members 28 and 29 are provided to extend beyond the confines of the tubular member 10, and light from the source 21 is transmitted axially through the members 28 and 29, in much the same manner as an ordinary optical telescope by means of other lenses 30 and 31 mounted in the tubes 28 and 29. An eye piece 32 with a lens 33 is positioned at the viewing end of the terminal telescoping member 29. The lens ratio of the lenses 26, 30, 31 and 33 is preferably one to one so that the image viewed through the telescopic viewing means 25 is not enlarged but is merely transmitted from the head 12 to the eye piece lens 33. Inasmuch as the objective lens 26 is of the "full view" type, it covers a sufficient angle so that the entire inner circumference of the member 10 may be viewed obliquely at one time, and it is necessary to use the mirror 23 only when it is desired to examine closely a relatively small area of the surface 10a. In order to facilitate movement of the apparatus 11 axially through the bore of the tubular member 10, a plurality of cantilever-type leaf springs 34 are mounted upon the periphery of the disk 14 to provide sliding contact with the inner wall surfaces 10a of the tubular member 10.

Electrical power is provided for the light source 21 and the electromagnetic coils 18 and 19 through a conduit 35 extending along the length of the bore of the tube 10. The conduit carrying power to the bulb 21 and the electromagnetic coil 18 may desirably extend through one of the tubular supporting members 15 of the head 12 as shown in Figure 2.

The operation of the device of Figure 1 will be evident to those skilled in the art. The interior surfaces 10a of the tubular member 10 are coated with magnetizable material, preferably in the form of finely divided particles. These particles preferably possess optical characteristics differing from those of the interior surfaces 10a, either by reason of the inherent color of the particles, because of a dye applied to the particles, or because of fluorescent material applied thereto. In case fluorescent material is employed, the light source 21 is preferably capable of emitting ultraviolet light or other exciting illumination.

According to one embodiment of the method of the present invention, the inspection material is initially applied to the interior surface 10a, and the device 11 is inserted into the bore of the member 10 and is moved progressively therealong with the eye piece 32 projecting from the end of the member 10. The interior surfaces 10a are illuminated by the light source 21 and may be readily viewed through the telescoping viewing means 25. The spring supports 34 serve to center the apparatus 11 within the bore being inspected while the electromagnetic coil 18, energized through the conduit 35, will set up a magnetic field within the walls of the tubular member 10 and particularly lengthwise of the inner surface 10a thereof. The electrical power supplied to the coils 18 and 19 may be A. C., D. C., pulsating D. C., or halfwave current. In any case, the particles of magnetizable material which are present on the surface 10a will orient themselves with respect to any flaws present in the surfaces, and the particle orientation may be readily viewed within the section of the tube illuminated by the light source 21 by merely looking through the eye piece 32 and the viewing means 25. In order to inspect closely all of the surface 10a, as when the mirror 23 is utilized, the device 11 may be rotated as it is moved through the bore.

Alternatively, the device 11 may be initially passed through the member 10 prior to the application of magnetizable material to the surfaces 10a to set up a magnetic field as above described. Next, finely divided magnetic material may be applied to the inner surfaces 10a, as by blowing powdered material into one end of the bore of the member 10, and the viewer 11 is again passed through the bore of the member 10, preferably with the coils 18 and 19 deenergized. Thus, any defects in the surfaces 10a can be observed by the orientation of the magnetic particles under the influence of residual magnetism.

In the embodiment of the present invention illustrated in Figure 3, reference numeral 10 again refers to a tubular member formed of magnetizable material and reference numeral 40 refers generally to a modified form of device as shown in Figure 1. The device 40 includes a plurality of disks 41, 42 and 43 spaced axially of the bore 10a, the disks being similar to the disks 13, 14 and 16 of the embodiment of Figure 1. Disk 41 carries spring supporting means 44 similar to the means 34 of Figure 1 while a pair of spaced electromagnetic coils 45 and 46, similar to the coils 18 and 19 of Figure 1, are carried by the disks 41 and 42, respectively, the disks being maintained in spaced apart relation by tubular supporting means 47.

A generally frusto-conical deflecting plate 48 is supported upon the tubes 47 passing therethrough adjacent to the plate periphery and a nozzle 49 having an enlarged outlet mouth 50 is likewise supported by the tubes 47 in closely spaced relation to the deflector plate 48. The nozzle 49 communicates through a conduit 51 with a source of powder or finely particulated magnetizable material for a purpose to be hereinafter fully explained. The plate 42 also carries a lamp socket 52 and a lamp 53 extending axially of the bore away from the coil 46, the socket 52 and the lamp 53 being similar to the socket 22 and lamp 21 of Figure 1. The disk 43 is supported in spaced relation to the disk 42 by means of hollow rods or tubes 54 which may also serve to carry an electrical conduit 55 supplying energy to the coils 45 and 46 and the lamp 53. A mirror 56 is supported in spaced relation to the plate 43 by means of the supporting arm 57, the mirror 56 being closely adjacent to the light source or bulb 53. The reference numeral 58 refers to a tubular member similar to the member 20 of Figure 1 constituting a portion of a viewing means similar to the means 25 of Figure 1 and hereinbefore described in detail.

The operation of the modified form of the device illustrated in Figures 3 and 4 will be evident to those skilled in the art from the foregoing description. However, in this instance the device 40 is inserted into the bore 10a prior to the application of magnetic material thereto, thus eliminating the separate step of previously treating the bore of the member 10 with magnetizable material. Magnetic material, preferably in the form of powdered or finely divided magnetizable particles suspended in a fluid stream, is blown into the bore 10a through the conduit 51 and the nozzle 49, the material emanating from the enlarged exit mouth 50 being deflected outwardly into contact with the surfaces 10a by means of deflector plate 48. The particles from the plate 48 pass through the magnetic field set up by the electromagnetic coils 45 and 46, this field also being present in and on the surface of the walls of the tubular member 10. The magnetic particles thus are subjected to the magnetic field and orientate themselves upon the surfaces 10a about any flaws present therein.

This orientation of magnetic material may be viewed by means of a telescopic viewers, as described in connection with Figure 1, the interior surface 10a being illuminated by light or exciting illumination emitted by the source 53 and reflected into the tubular member 58 either directly or by means of the mirror 56. Although the viewing means, namely the mirror 56, the tubular member 58 and the light source 53, are not in the magnetic field proper, the wall surfaces 10a will retain sufficient residual magnetism to maintain the particles in their oriented condition until after they have been viewed as hereinbefore described.

The method of the present invention will be appreciated from the disclosure of the apparatus as hereinbefore described. The method includes the application of magnetizable material to the wall surface 10a, orientation of the magnetic material by means of the magnetic field set up by the operation of the coils 18—19 or 45—46, and this magnetic material orientation may be readily viewed visually, as by the means herein set forth.

It will be noted that the spring mounting means 34 and 44 will not interfere with the oriented pattern assumed by the magnetizable material present upon the surfaces 10a. In the case of the first embodiment of the invention, the springs contact the inner surfaces 10a at a point rearwardly of that being viewed through the mirror 23, while in the embodiment of Figure 3 the springs 44 contact the walls 10a in advance of the magnetic field ahead of the point at which the magnetic material is applied to the surface 10a.

It will also be appreciated that the apparatus 11 can be inserted into either end of the tubular member 10 so that a member having an axial length twice that of the apparatus may be inspected by inserting the apparatus in one end of the tubular member to inspect one-half of the bore of the member and then inserting the apparatus in the other end of the member to complete the inspection.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. Apparatus for magnetically inspecting the inner surface of a tubular member, comprising a head insertable into said member, means carried by said head for magnetizing said inner surface, telescopic viewing means secured to said head and of such length as to project from the tubular member as said head is moved lengthwise within said tubular member relatively thereto, and light reflective means carried by said head and positioned in proximity to said magnetizing means to reflect light from the inner surfaces of said member into said viewing means.

2. Apparatus for magnetically inspecting the inner surface of a tubular member to which ferromagnetic particles have been applied, comprising an elongated head insertable into said member, a pair of spaced electromagnetic coils carried by said head, means for supplying electric current to said coils to energize the same and set up a magnetic field therebetween so that said particles will orient themselves about any flaws in said wall surfaces, a light source carried by said head in close proximity to said coils, and telescopic viewing means of such length as to project from said head beyond the confines of the tubular member as said head is inserted axially into said member, said telescopic viewing means being constructed and arranged to receive light reflected from the inner surface of said tubular member, whereby orientation of said magnetized particles upon said surface may be viewed through said viewing means and the presence of flaws in said surface may be detected.

3. Apparatus for magnetically inspecting the inner surface of a tubular member to which ferromagnetic particles have been applied, comprising a head insertable within said member, a pair of spaced electromagnetic coils carried by said head, means for supplying electric current to said coils to energize the same and set up a magnetic field therebetween so that said particles will become oriented on said surface, a light source carried by said head and interposed between said coils, and viewing means also carried by said head for transmitting light axially along the length of said member.

4. Apparatus for magnetically inspecting the inner surface of a tubular member to which ferromagnetic particles have been applied, comprising an elongated head insertable into said member, electromagnetic elements carried by said head and spaced axially of said member upon insertion of the head thereinto, means for supplying electric current to said elements to energize the same and thus set up a magnetic field therebetween so that said particles will become oriented on said surface, telescoping viewing means of such length as to project axially from said tubular member as the head is inserted thereinto, and a light source positioned between said elements to illuminate said inner surface and said particles present thereon, whereby orientation of said particles upon said surface may be observed through said viewing means.

5. Apparatus for magnetically inspecting the inner surface of a tubular member to which ferromagnetic particles have been applied, comprising an elongated head insertable into said member, a pair of spaced electromagnetic coils carried by said head, means for supplying electric current to said coils to energize the same and thus set up a magnetic field therebetween including said particles, resilient means carried by said head for centering said head within said member, a light source carried by said head and interposed between said coils, and viewing means secured to said head and of such length as to extend beyond the confines of said member as said head is moved lengthwise within said tubular member to transmit an image of said magnetized particles to a position without said member.

6. Apparatus for magnetically inspecting the inner surface of a tubular member, comprising a head insertable within said member for axial movement through said member, a pair of spaced magnetic coils carried by said head, a deflector plate carried by said head and located between said coils, a nozzle for connection to a source of powdered ferromagnetic material for discharging said material under fluid pressure against said deflector plate, and a light source carried by said head rearwardly of said coils, whereby the pattern assumed by magnetized particles upon the inner wall surfaces of said members due to residual magnetism in said member may be observed by means of illumination from said light source following said coils as said head is moved through said member.

7. The method of inspecting the interior surface of a tubular member which comprises magnetizing said member lengthwise thereof, blowing finely particulated magnetic particles under air pressure into said tubular member, and progressively reflecting and visually observing the reflected image of the pattern assumed by said particles along successive increments of said interior surface while the particles are subject to said magnetization, whereby the entire tubular member is progressively inspected in successive increments therealong said magnetization.

8. The method of inspecting the interior surface of a tubular member which comprises progressively magnetizing said member lengthwise thereof, blowing under air pressure a stream of powdered magnetic material onto the magnetized inner surface of said tubular member, and progressively reflecting and visually observing the image of the pattern assumed by said particles along successive increments of said inner surface under the influence of such magnetization to detect the presence of surface defects therein whereby the entire tubular member is progressively inspected in successive increments.

9. The method of inspecting the interior surface of a tubular member, which comprises applying magnetizable particles to said inner surface of said member, progressively magnetizing increments along said member, and progressively reflecting and visually observing the reflected image of the orientation of said particles on said increments along said member contemporaneously with the magnetization of said increments whereby magnetization and observation take place progressively through the tubular member.

10. The method of inspecting the interior surface of a tubular member which comprises magnetizing a portion of the interior surface of said member, contemporaneously applying finely particulated magnetic particles to the magnetized portion of said member, and contemporaneously with the magnetizing of said portion of the tubular surface observing the reflected image of the pattern assumed by said particles on said portion of the interior surface of said tubular member.

11. Apparatus for inspecting the inner surface of a tubular member, comprising a head insertable into said member, viewing means connected to said head and of such length as to project from the tubular member as said head is moved within said tubular member, means for magnetizing a portion of the inner surface of said tubular member, means carried by said head for delivering ferromagnetic particles onto said magnetized portion of said tubular member inner surface, and light reflective means carried by said head for reflecting light from said magnetized portion of said tubular member inner surface into said viewing means to indicate any flaws therein.

12. Apparatus for magnetically inspecting the inner surface of a tubular member, comprising an assembly insertable into said member including viewing means of such length as to project from the tubular member beyond the confines of the tubular member as the assembly is moved axially into said member, illuminating means carried by said assembly for illuminating the interior of said member, said viewing means being constructed and arranged to receive light reflected from the inner surface of said tubular member, and means including a conduit terminating in proximity to said illuminating means and carried by said assembly for delivering ferromagnetic particles to the inner surface of said tubular member, whereby when the surface is magnetized, the orientation of said particles upon said surface may be viewed through said viewing means to observe any flaws therein.

References Cited in the file of this patent

UNITED STATES PATENTS

| Number | Name | Date |
|---|---|---|
| 1,947,729 | Morrison | Feb. 20, 1934 |
| 2,124,579 | Knerr et al. | July 26, 1938 |
| 2,216,600 | Moore | Oct. 1, 1940 |
| 2,251,739 | Huntsinger | Aug. 5, 1941 |
| 2,371,176 | Kirk et al. | Mar. 13, 1945 |
| 2,495,545 | Peterson et al. | Jan. 24, 1950 |
| 2,587,476 | Huhn | Feb. 26, 1952 |

FOREIGN PATENTS

| Number | Country | Date |
|---|---|---|
| 547,714 | Great Britain | Sept. 8, 1942 |